(12) United States Patent
Ferrar et al.

(10) Patent No.: US 11,679,926 B2
(45) Date of Patent: Jun. 20, 2023

(54) POWDER TRANSPORT CONTAINER

(71) Applicant: LPW Technology Ltd., Widnes (GB)

(72) Inventors: Ben Ian Ferrar, Alsager (GB); Rob James Deffley, Sheffield (GB)

(73) Assignee: LPW Technology Ltd.

( * ) Notice: Subject to any disclaimer, the term of this patent is extended or adjusted under 35 U.S.C. 154(b) by 626 days.

(21) Appl. No.: 16/639,453

(22) PCT Filed: Aug. 15, 2018

(86) PCT No.: PCT/GB2018/052318
§ 371 (c)(1),
(2) Date: Feb. 14, 2020

(87) PCT Pub. No.: WO2019/034874
PCT Pub. Date: Feb. 21, 2019

(65) Prior Publication Data
US 2021/0138553 A1  May 13, 2021

(30) Foreign Application Priority Data
Aug. 16, 2017 (GB) ...................................... 1713143

(51) Int. Cl.
*B65D 83/06* (2006.01)
*B33Y 40/00* (2020.01)
(Continued)

(52) U.S. Cl.
CPC .............. *B65D 83/06* (2013.01); *B22F 10/85* (2021.01); *B22F 12/52* (2021.01); *B22F 12/90* (2021.01);
(Continued)

(58) Field of Classification Search
CPC .......... B22F 12/52; B22F 10/85; B22F 12/90; B33Y 40/00; B33Y 50/02; B65D 1/24;
(Continued)

(56) References Cited

U.S. PATENT DOCUMENTS 4,924,601 A    5/1990 Bercaw
4,930,229 A *  6/1990 Moser ..................... F26B 9/063
                                                    34/491

(Continued)

FOREIGN PATENT DOCUMENTS

BR    PI0419029 A  * 11/2007  .......... D01G 99/005
CN    206140936        5/2017
(Continued)

*Primary Examiner* — Mohammad Ali
*Assistant Examiner* — Joshua T Sanders
(74) *Attorney, Agent, or Firm* — Burns & Levinson LLP; Daniel McGrath, Esq.

(57) ABSTRACT

A container (300) adapted to store a quantity of metal powder (101, 301), the container (300) comprising a container body having an opening and a sensing device (111, 121) for sensing the temperature of the powder (101, 301) and/or the humidity level inside the container (300), wherein a first reading received from the sensing device (111, 121) is compared to a second reading received from a second sensing device configured to sense the temperature and/or humidity level of an environment outside of the container, and based on the first reading and the second reading, a user is provided within an indication about whether the container can be opened.

19 Claims, 4 Drawing Sheets

(51) Int. Cl.
*B33Y 50/02* (2015.01)
*B22F 10/85* (2021.01)
*B22F 12/90* (2021.01)
*B22F 12/52* (2021.01)
*B65D 51/24* (2006.01)
*G01K 13/02* (2021.01)
*G01N 25/66* (2006.01)
*G01S 13/46* (2006.01)
*B22F 10/20* (2021.01)

(52) U.S. Cl.
CPC .............. *B33Y 40/00* (2014.12); *B33Y 50/02* (2014.12); *B65D 51/24* (2013.01); *G01K 13/02* (2013.01); *G01N 25/66* (2013.01); *G01S 13/46* (2013.01); *B22F 10/20* (2021.01); *G01S 2013/468* (2013.01)

(58) Field of Classification Search
CPC ........ B65D 83/06; G01K 13/02; G01N 25/66; G01S 13/46
USPC ...................................................... 206/459.1
See application file for complete search history.

(56) References Cited

U.S. PATENT DOCUMENTS

| | | | |
|---|---|---|---|
| 9,977,425 B1 * | 5/2018 | McCann | ............ G05B 19/4099 |
| 2003/0033057 A1 | 2/2003 | Kallestad | |
| 2015/0321418 A1 | 11/2015 | Sterman et al. | |
| 2016/0023395 A1 | 1/2016 | Zhang | |

FOREIGN PATENT DOCUMENTS

| | | | | |
|---|---|---|---|---|
| EP | 3037235 | 6/2016 | | |
| GB | 2520161 | 5/2015 | | |
| GB | 2520161 A * | 5/2015 | ............. | B65D 88/00 |
| JP | S6188817 A | 10/1984 | | |
| JP | 2005-153848 A | 11/2003 | | |
| JP | 2005193947 A | 7/2005 | | |
| WO | 2015/054082 | 4/2015 | | |
| WO | WO-2015054082 A1 * | 4/2015 | ............. | G06Q 10/68 |
| WO | WO2015/069916 A1 | 5/2015 | | |
| WO | WO2016/046539 A2 | 3/2016 | | |

* cited by examiner

POWDER TRANSPORT CONTAINER

CROSS-REFERENCE TO RELATED APPLICATIONS

This application is the U.S. national phase entry under 35 U.S.C. § 371 of International Application No. PCT/GB2018/052318, filed Aug. 15, 2018, entitled POWDER TRANSPORT CONTAINER, which in turn claims priority to and benefit of Great Britain Application No. 1713143.4, filed Aug. 16, 2017, each of which is incorporated herein by reference in their entirety for all purposes.

TECHNICAL FIELD OF THE INVENTION

The present invention relates to a container that is capable of determining whether powder within the container has acclimatised to its surroundings. The present invention also relates to a system comprising the container and an additive manufacturing machine.

BACKGROUND TO THE INVENTION

The present invention is applicable in particular—but not exclusively—to storage of particulate material, including powders and more specifically metal powders. Powdered material is used in layer manufacturing. In this context it is important that the powder is sufficiently dry when delivered to its point of use. Moisture can cause the powder to clump and prevent it from flowing in the desired manner. Powder may be factory-packed in containers with sealed lids. This may be done under a controlled atmosphere (e.g. argon, nitrogen or dried air). The powder is shipped to the user in this form and should arrive in a dry and free-flowing state.

The state of the powder may however be impaired between opening of the container and usage of the powder, especially due to condensation. Containers may for example be shipped and/or stored in a cold environment, e.g. outdoors, and then brought into a warmer indoor environment. Thus, the powder may be colder than its surroundings when the container is opened, causing water vapour from the ambient air to condense on the powder, and to penetrate interstices between powder particles, impairing the powder quality.

It may therefore be necessary to acclimatise the powder by keeping it in the working environment for an extended period of time so that the powder temperature broadly corresponds to the temperature of its surroundings. When the container is then opened, any tendency for water to condense upon it is reduced or avoided and the powder remains in a suitable state for use.

When using known containers there is no way to know whether the powder is up to room temperature prior to opening the container. The period of time required for this equalisation of temperature depends on several factors and is uncertain. The acclimatisation process can in some cases take several days, but in other cases acclimatisation may not even be necessary. From the point of view of the user, it is desirable to minimise the delay prior to use of the powder. For the manufacturer or distributor, problems arise where the powder container has been opened too early and ruined, or some powder taken, but the consignment is returned to the distributor as "faulty" or "incomplete" whereas the powder was in fact delivered to the user in a proper condition for use, problems originating with the user themselves. These are commercial problems, but underlying them is a technical problem: a convenient and practical means is needed for assessing, before the container his opened, whether its content has sufficiently acclimatised to its surroundings.

SUMMARY OF THE INVENTION

According to a first aspect of the invention there is provided a container for storing a quantity of powder, the container comprising:
  a container body having an opening, and
  a sensing device for sensing the temperature of the powder and/or the humidity level inside the container, wherein a first reading received from the sensing device is compared to a second reading received from a second sensing device configured to sense the temperature and/or humidity level of an environment outside of the container, and based on the first reading and the second reading, a user is provided with an indication about whether the container can be opened.

The container may be adapted to store a quantity of metal powder in the container.

The container may comprise a lid. In the context of the present invention the term "lid" should be understood to refer to any type of closure by which an opening in a suitable container is able to be closed.

The sensing device may be attached to an inner surface of the lid. Alternatively, the sensing device can be attached to a limb which depends downwardly from the inner surface of the lid so that the sensing device extends into the powder.

In some embodiments of the invention the sensing device may be attached to an inner surface of the container body. In particular, the sensing device may be mounted to an inner surface of a container side wall.

The container may comprise a part-conical body portion. The part-conical body portion may be located in a lower region of the container. The sensing device may be provided in the part-conical portion of the container, and by providing the sensing device in this region, it is possible to sense the internal temperature of the powder at lower powder levels.

The container may comprise an outlet and an outlet valve for selectively opening and closing the outlet. The outlet may be adapted to engage with an inlet of an additive manufacturing machine while the outlet valve can for example be used to control the flow of powder from the container into the additive manufacturing machine. The sensing device may be arranged to sense downstream of the outlet valve.

Accordingly, when the outlet of the container is connected to an inlet of an additive manufacturing machine, the sensing device will be present in a region between the outlet valve of the container and an inlet valve of the additive manufacturing machine. This is turn means that it will be possible to determine whether the powder in this region has acclimatised to the surroundings before the inlet valve is opened. If it is determined that powder in this region has not acclimatised to the outside environment, then this will be indicated to the user.

The container may comprise a plurality of sensing devices. For instance, sensing devices may be provided at any or all of the following locations: on an inner surface of the lid, on a limb depending downwardly from the lid, on an inner surface of a container side wall, in the conical portion of the container body and downstream of the outlet valve.

The sensing device may comprise a temperature and/or humidity sensor.

The sensing device may comprise a sensor for determining the dew point within the container. It may be desirable to sense the dew point since if the dew point within the container is reached then this could be indicative of deterioration of the powder within the container. In the event the dew point is reached then this may be indicated to the user and/or be recorded. It will be appreciated that the dew point sensor could also be provided as a separate sensor independent of the sensing device.

The second sensing device may be provided on an outer surface of the container or the lid. Alternatively, the second sensing device may be remote from the container. For example, the second sensing device may be attached to a surface, e.g. a wall or a ceiling, of a confined environment in which the container is being stored. The second sensing device may comprise a temperature sensor and/or a humidity sensor.

The sensing device and the second sensing device may each comprise temperature sensors, wherein a first temperature reading from temperature sensor of the sensing device is compared with a second temperature reading from the temperature sensor of the second sensing device, and a determination is made based on those temperature readings about whether the container can be opened. In particular, the temperature sensor of the sensing device may sense the temperature of the powder within the container and compare this to the ambient temperature outside of the container as sensed by the temperature sensor of the second sensing device.

In one embodiment of the invention the difference between the temperature received from the sensing device and the temperature received from the second sensing device may be used to make the determination about whether the container can be opened.

The step of determining whether the container can be opened may be recorded. Advantageously, this enables a supplier of the powder to establish whether or not the container was inappropriately opened, e.g. before the powder had acclimatised to the environment outside of the container.

The temperature sensor of the sensing device and the temperature sensor of the second sensing device may be formed as two junctions of a temperature-sensitive thermocouple.

The container may comprise an indicator to provide the user with an indication about whether the container can be opened. This may be a visual indication, an audible indication or an audio-visual indication. For instance, the visual indication could be a light source, e.g. in the form of a light emitting diode (LED). As an example, the LED may be configured to illuminate green if the container can be opened safely, and to illuminate red at all other times.

The container may be "locked" automatically if it is determined that powder in the container has not acclimatised and that it would be inappropriate to open the container. In this regard, the term "locked" should be understood to mean that a user is unable to remove the lid and/or open the outlet until it has been established that the powder has acclimatised to its surroundings.

In the event it is determined the powder has not acclimatised and that it would be inappropriate to open the container, the container may be configured to provide an operative or user with an indication of how much time is needed for the powder in the container to acclimatise to its surroundings. This may be communicated to the operative or user on a display screen located on or remote from the container.

The container may comprise an antenna which can be used to determine the location of the container within a confined environment such as a factory. In particular, the location of the container within the confined environment may be determined by triangulation of the container's antenna. The antenna may be a Wi-Fi antenna.

The container may be configured to communicate with the nearest available second sensing device in the confined environment. This has the benefit that the first sensor reading obtained from the sensing device will be compared with a second reading obtained from a second sensing device located in the vicinity of the container, rather than with a second sensing device located distal from container where the environmental conditions may be different to those in which the container is located. The container may communicate with the nearest available sensing device and/or with a remote monitoring station by a wireless connection, e.g. a low energy Bluetooth connection.

The container may comprise a Radio-frequency identification tag for determining the location of the container within the confined environment. Accordingly, this enables a user to determine where a particular container is, and where it has been, remotely. In particular, a user can identify if a container has ever been placed in a part of the factory where it has been subject to increased risk of contamination. It also enables a user to identify whether a container containing contaminated powder has been removed from a designated "quarantine" area.

The container may be connectable to a powder sizing machine. The powder sizing machine may include but is not limited to a sieve. The sieve may comprise a mesh for separating undesirable particles from the powder. Thus, only powder particles of the desired size are able to pass through the mesh into the container which ensures that particles of the appropriate are carried forward for additive manufacturing.

In an embodiment of the invention the powder may be stored in the container under a controlled atmosphere.

According to a second aspect of the invention there is provided a system comprising the container assembly according to the first aspect of the invention and an additive manufacturing machine.

The system according to the second aspect of the invention many incorporate any or all features of the container according to the first aspect of the invention as desired or as appropriate.

The additive manufacturing machine may comprise an inlet valve for selectively opening and closing an additive manufacturing machine inlet. Thus, when the outlet valve is open but the inlet valve is closed, powder will be retained in the region between the outlet valve and the inlet valve until it has been determined that powder in that region has acclimatised to the outside environment. Once the powder has acclimatised to the outside environment, the user may then open the inlet valve to allow powder to flow from the container into the additive manufacturing machine until one or both valves are closed again.

To determine whether powder present in the region between the inlet valve and the outlet valve has acclimatised, a sensing device may be provided in the region between the outlet valve and the inlet valve. While the sensing device can be provided in the outlet downstream of the outlet valve, it will also be appreciated that a sensing device can be placed in the inlet upstream of the inlet valve of the additive manufacturing machine.

In an embodiment of the invention the second sensing device may be provided in the additive manufacturing machine itself.

According to a third aspect of the invention the container according to the first aspect of the invention comprises a powder. In particular, the container may comprise a metal powder for use in additive manufacturing.

DETAILED DESCRIPTION OF THE INVENTION

In order that the invention may be more clearly understood one or more embodiments thereof will now be described, by way of example only, with reference to the accompanying drawings, of which.

Figure 1:
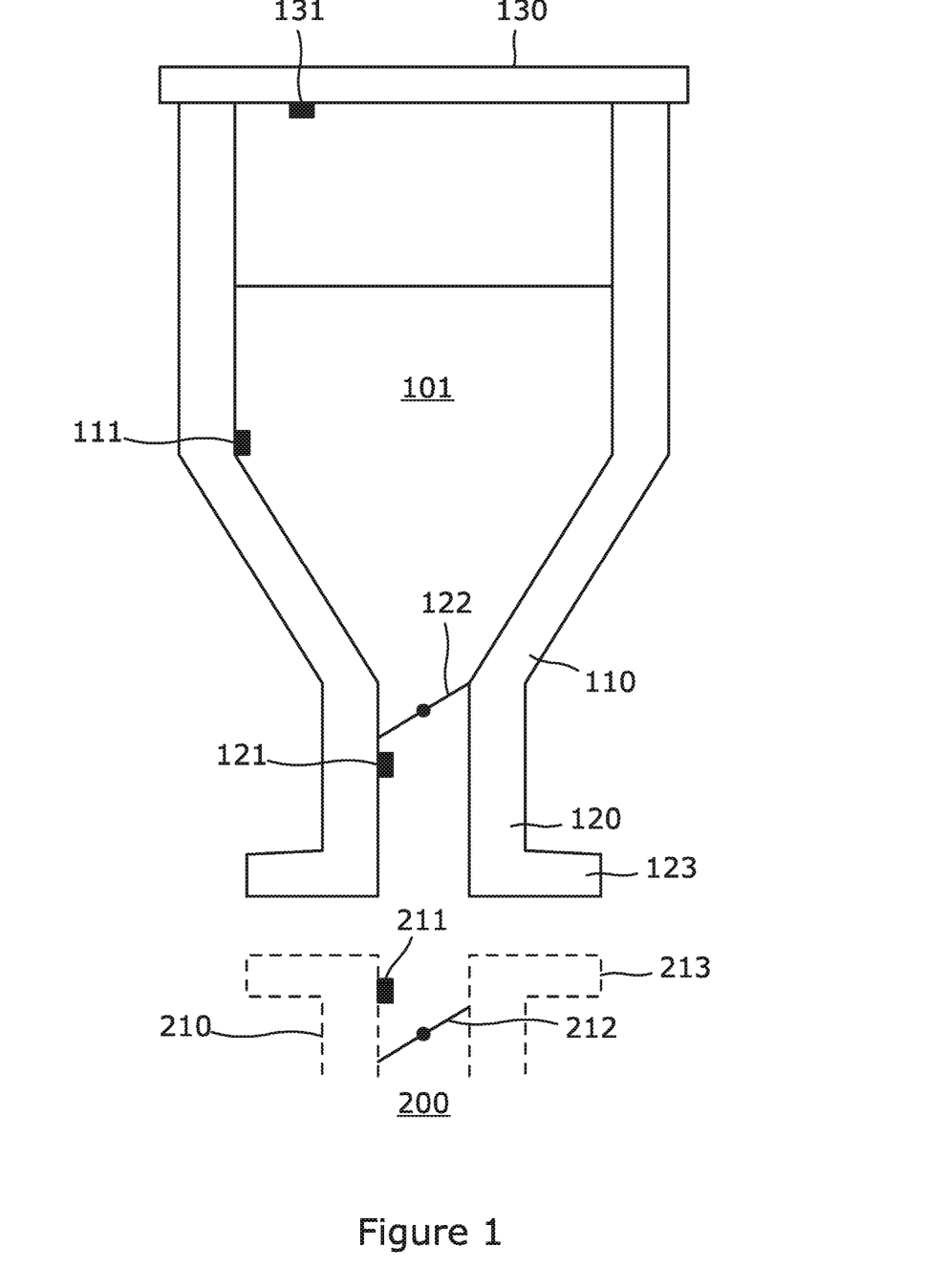
FIG. 1 is a schematic of a container of a first embodiment of the present invention.

As best shown in FIG. 1 there is provided a container 100 for storing and/or transporting a powder 101. The container has a part conical body 110 which leads to an outlet 120. The container 100 also comprises a removable lid 130 which is sealingly affixable to the upper periphery of the container main body 110.

The container 100 comprises a sensing device 131 provided on an inner surface of the lid 130 for detecting the temperature and/or the humidity level inside the container 100. A further sensing device 111 comprising a temperature sensor is provided in a lower region of the container 100 upstream of an outlet valve 122 configured to open and close the outlet 120. This enables a user to accurately measure the internal temperature of the powder 101 even when the content of powder 101 in the container 100 is low. Another sensing device 121 comprising a temperature sensor is provided in the outlet 120.

Figure 2:
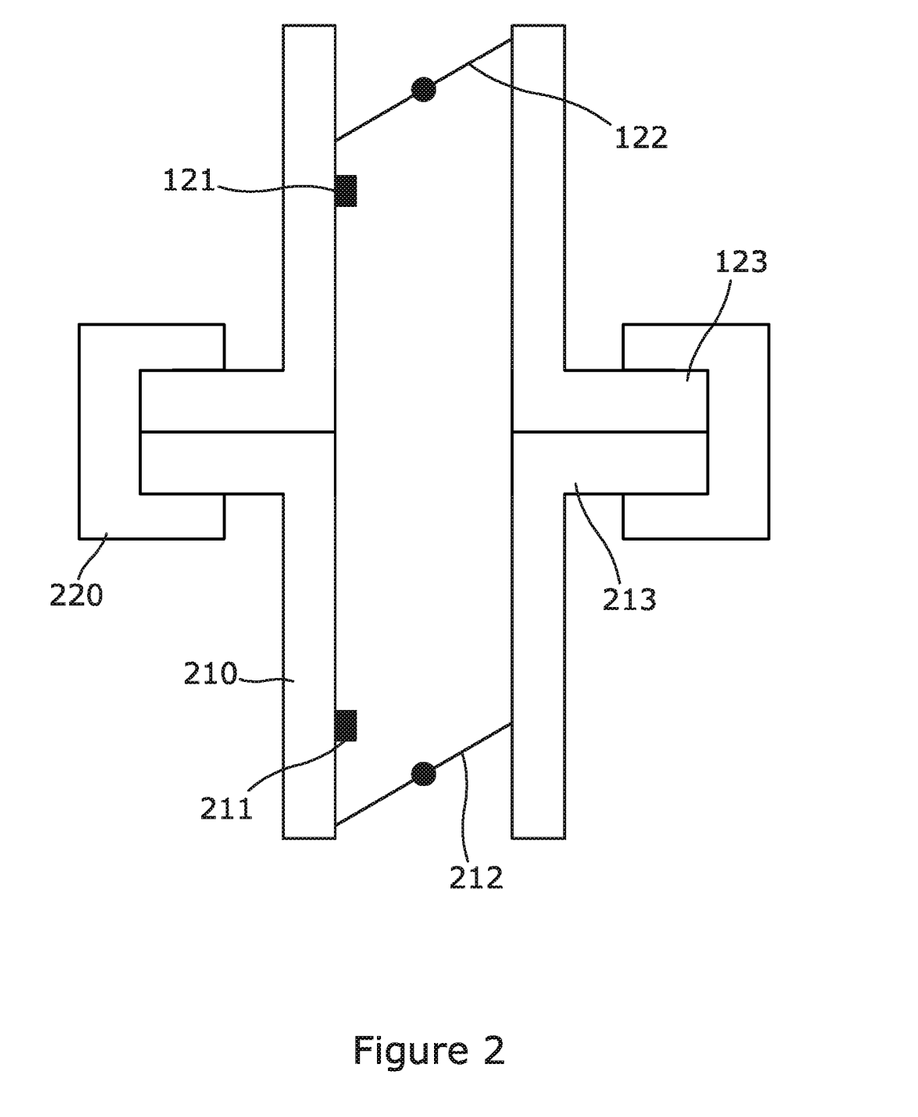
FIG. 2 is a schematic view of the container of FIG. 1 connected to an additive manufacturing machine.

The container 100 of this embodiment of the invention is, in use, connected to an additive manufacturing machine 200. The additive manufacturing machine 200 comprises an inlet 210 and an inlet valve 212. An additive manufacturing machine sensing device 211 can be provided upstream and/or downstream of the inlet valve 212. The container outlet 120 terminates in a radially outwardly extending connection flange 123 that is adapted to connect to a corresponding inlet connection flange 213 of the additive manufacturing machine 200. As shown in FIG. 2, a vacuum flange clamp 220 is used to secure the outlet connection flange 123 and the inlet connection flange 213 together.

In this embodiment of the invention a second sensing device (not shown) comprising a temperature sensor is provided remote from the container. In particular, the second sensing device is attached to a ceiling of a room.

In one example, a control unit (not shown) is configured to receive readings from the sensing device 111 and from the second sensing device 140 and based on the readings it receives, a determination is made about whether powder 101 present in the region between the outlet valve 122 and the inlet valve 212 has acclimatised to its surroundings. In particular, the control unit is configured to receive a temperature reading from the sensing device 121 located in the outlet 120 downstream of the outlet valve 122 and a temperature reading from the second sensing device 140. The control unit then compares the temperature readings it has received, and if the temperature of the powder 101 sensed by the sensing device 121 falls within a certain range of the ambient temperature sensed by the second sensing device 140, then a visual indication, e.g. an LED light source changing from red to green, will be provided to the user. The user can then open the outlet valve 122 and the inlet valve 212 so that powder 101 can flow into the additive manufacturing machine 200. The range may for example be plus or minus 1° C., so that provided there is no more than 1° C. between the sensed powder 101 temperature and the ambient temperature.

However, if it is determined that the powder 101 in this region has not adequately acclimatised, then the LED will remain red and the inlet valve 212 and/or the outlet valve 122 will be locked so that powder is unable to flow into the additive manufacturing machine 200.

The container additionally comprises a dew point sensor 132 attached to an inner surface of the lid 130. The dew point sensor 132 is configured to communicate and relay dew point sensor readings to the control unit. If the dew point is reached, water droplets, or dew, will form on the powder 101 which could result in deterioration of the powder 101 in the container and/or reduce its flowability. Thus, if it is determined that the dew point has been reached then this will be indicated to the user and/or the outlet valve 122 and/or inlet valve 212 will be locked to prevent powder from entering the additive manufacturing machine.

The control unit's processor is also configured to determine how much time is needed for powder within the container to acclimatise to its surroundings. For instance, if the sensing device 121 detects that the temperature of the powder in the container 100 is 8° C. and a dew point reading of 19.5° C. is determined by the second sensing device 140, then the temperature of the powder will need to rise 12° C. before it would be safe for an operative or user to open the container 100. Based on this information, the weight of the powder and the specific heat capacity of the powder in the container the processor is able to calculate the amount of energy required to increase the temperature of the powder by 12° C. and how long this will take.

A Wi-Fi antenna 112 is provided on an outer surface of the container 100. In use, the antenna 112 emits a signal which is detected by two receivers (not shown) provided in different locations in a confined environment within which the container 100 is being stored. This enables a user to determine the location of the container 100 within the confined environment by triangulation of the container's antenna 112.

The container 100 additionally comprises a radio-frequency identification tag 113 which enables a user to determine track where a particular container 100 is, and where it has been, remotely. For instance, a user can identify whether a container 100 has ever been placed in a part of the factory where it has been subject to increased risk of contamination. It also enables a user to identify whether a container containing contaminated powder has been removed from a designated "quarantine" area.

Figure 3:
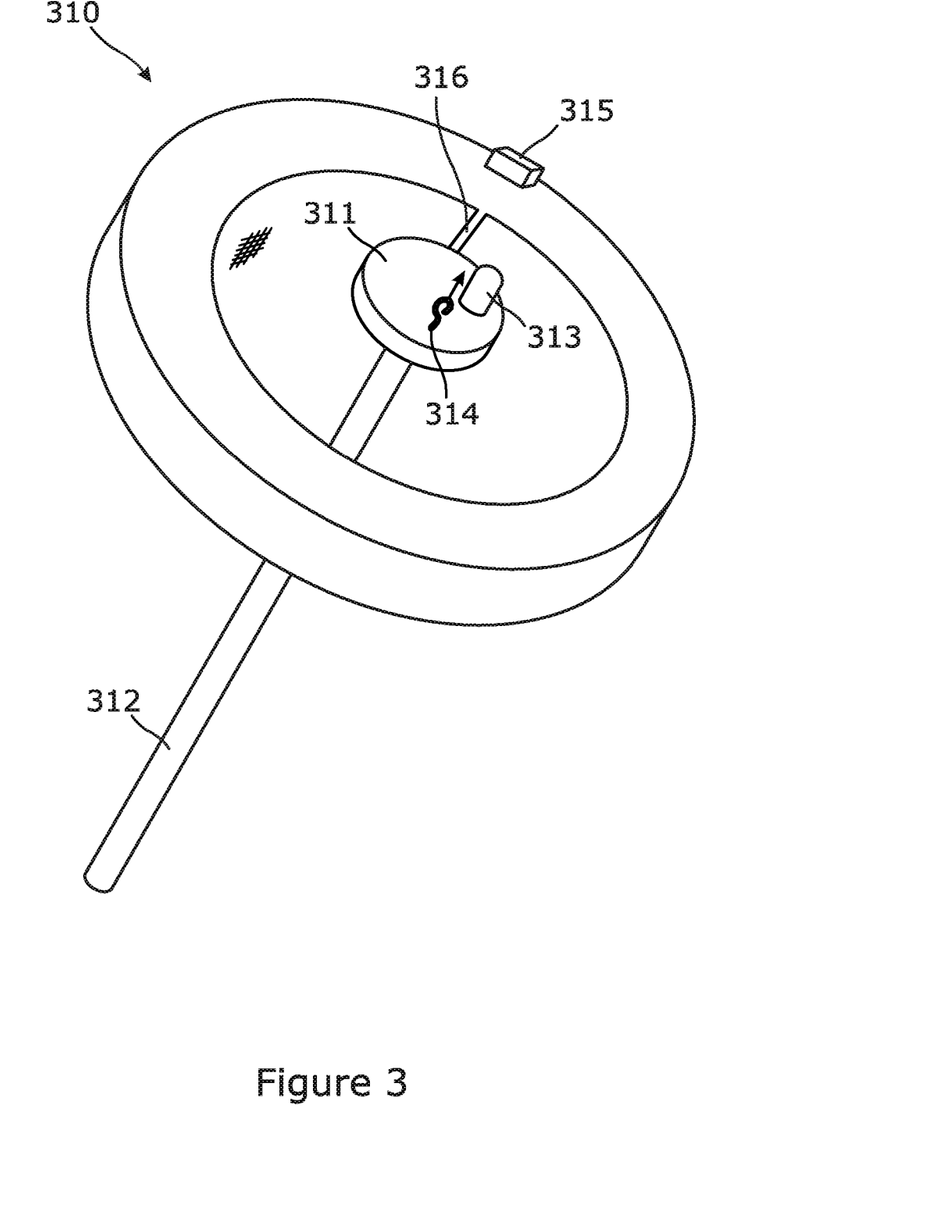
FIG. 3 is a schematic view of a lid comprising a sensing device.

In accordance with a second embodiment of the invention there is provided a container 300 comprising a lid 310 for closing the container 310. As shown in FIG. 3, the lid 310 of the present embodiment is a screw type lid 310 which is circular in plan and has a depending skirt which is internally threaded. The threads are omitted from the drawings for the sake of representational simplicity but of course threaded container lids are in themselves wholly familiar to the skilled person. The lid 310 serves to close and seal the container 300 in use. The container 300 has an externally threaded annular neck 301 defining a container opening. To close the container 300, the lid 310 is screwed onto the neck, forming the configuration depicted in FIG. 4. A seal may be formed between the upper periphery of the neck and a downwardly directed inner face of the lid 310. This need not be the only seal provided. For example, the container 300 may be supplied to the user with a foil or paper panel across the container 300 opening, adhered to the upper periphery of the annular neck 301. This panel would be torn away upon first opening the container 300.

Figure 4:
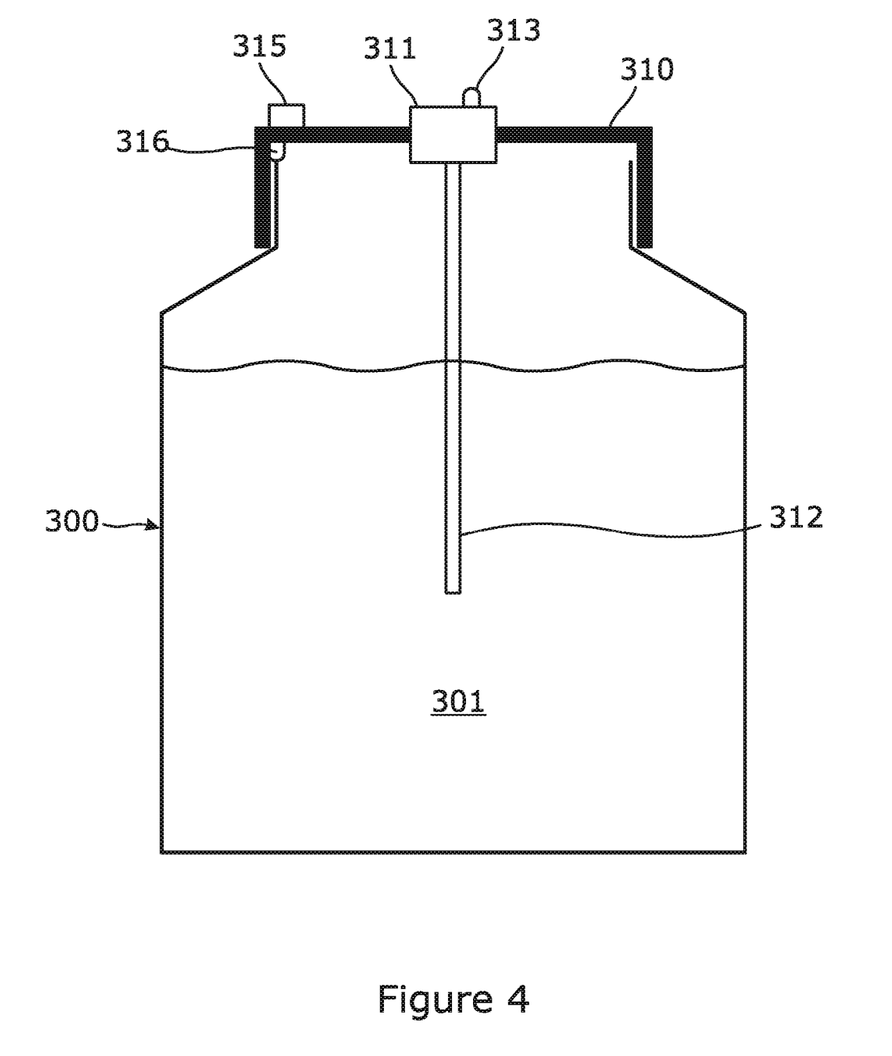
FIG. 4 is a schematic of a container according to a second embodiment of the invention provided with the lid of FIG. 3.

As shown in FIGS. 3 and 4, the lid 310 is provided with a sensing device 311 comprising a temperature sensor that is disposed inside the container 300 when the lid 310 is in place upon it. In the present embodiment the sensing device 311 is carried on a limb 312 projecting from the lid 310 into the container 300. When, as depicted in FIG. 4, the container 300 is wholly or partially filled with powder 301, the temperature sensor lies within the product 301 and so responds to its interior temperature, and not to the temperature at the powder's 301 surface. The interior temperature is expected to fluctuate less than the surface temperature and to provide a better indication of whether the powder 301 has adequately acclimatised. In the present example the powder 301 is a metal powder for use in layer manufacturing.

In this embodiment of the invention a second sensing device 313 comprising a temperature sensor that is responsive to ambient temperature is carried on an exterior face of the lid 310.

Based on the output of the temperature sensor of the sensing device 311 and the output of the temperature sensor of the second sensing device 313, the user is provided with an indication of whether the powder 301 is adequately acclimatised. This again may be a visual indication, and in the illustrated embodiment this indication is provided by means of a light source 314 in the form of a light emitting diode (LED) which illuminates green to indicate that the lid 310 can be removed safely, and which may be illuminated red at other times.

In the present embodiment a comparison is made between the powder 301 temperature detected by the temperature sensor of the sensing device 311 and the ambient temperature detected by the temperature sensor of the second sensing device 313. This comparison may in particular be made by means of an electronic circuit, which may be analogue or digital.

In one embodiment the temperature sensor of the sensing device 311 and the temperature sensor of the second sensing device 313 are formed as two junctions of a temperature-sensitive thermocouple. The thermocouple is a well-known device to the skilled person and will not be described in detail herein. It provides an output voltage which varies with difference in temperature between the thermocouple's two junctions. The output of the thermocouple is led to amplifying and control electronics (which may be analogue devices) to control the visual indication provided (e.g. through the light source 314) to the user.

However, the present embodiment instead uses digital electronics to interpret the outputs of the first and second sensing devices 311, 313 and to control the visual indication provided to the user. Specifically, it comprises a control unit 315 which receives the outputs of the temperature sensors and controls the LED light source 314. The control unit 315 is configured to provide an indication that the container can be opened only when the difference in internal powder 301 temperature measured by the temperature sensor of the first sensing device 311 lies within a certain range of the ambient temperature measured by the temperature sensor of the second sensing device 313.

In certain embodiments the lid 310 is tamper-evident. This is accomplished by use of a switching device, formed in this example as a microswitch 316 and connected to the control unit 315. The state of the switching device depends on whether the lid 310 is in place on the container 300. In the illustrated embodiment the microswitch 316 contacts the rim of the container under the lid 310 and is actuated when the lid 310 is screwed onto the neck of the container 300. When the lid 310 is even slightly opened, the state of the microswitch 316 is changed and the control unit's processor detects that the container 300 has been opened.

The control unit's 315 processor is also configured to record whether the container 300 has been inappropriately opened. In the present embodiment the processor is configured to fix the red/green state of the LED once opened, pending a factory reset. If, for example, a user returns powder 301 to the distributor complaining of poor quality, then the distributor is able to determine whether the container 300 was opened after proper acclimatisation (LED green), or not (LED red). More sophisticated embodiments may for example log opening and closing events and sensor outputs upon such events.

Embodiments of this type may also be used to determine whether the container 300 has been opened at all, helping to detect theft of powder 301. Powders 301 used for layer manufacturing can have high value (more than £500/kg in some cases) making detection of theft a high priority.

In the present embodiment provision is made for factory re-setting of the acclimatisation monitoring system. This may comprise a wired or wireless interface, e.g. in the form of an RFID tag. More simply, a pull-out tab may be removable to activate the processor once the lid has been factory-sealed.

The embodiments specifically described herein use electrical or electronic sensing technology but devices based on other physical principles could be substituted, including thermometers based on thermal expansion of a liquid, or devices such as bimetal strips based on thermal expansion of a solid. Suitable electric/electronic devices include solid state sensors and thermocouples. The embodiments described herein use solid state temperature sensors which are well known and widely commercially available.

The above embodiments are described by way of example only. Many variations are possible without departing from the scope of the invention.

The invention claimed is:

1. A container adapted to store a quantity of metal powder, the container comprising:
   a container body having a sealed opening, and
   a first sensing device for sensing the temperature of the powder and/or the humidity level inside the container, wherein a first reading received from the sensing device is compared to a second reading received from a second sensing device configured to sense the temperature and/or humidity level of an environment outside of the container, and Wherein the container is configured to communicate with the nearest available second sensing device attached to a surface of a confined environment in which the container is being stored,
   and based on the first reading and the second reading, a user is provided with an indication of whether the metal powder in the sealed container has acclimatised to its surroundings and whether the container is safe to open.

2. A container according to claim 1, wherein the container comprises a lid and the first sensing device is attached to an inner surface of the lid or to a limb which depends from the inner surface of the lid.

3. A container according to claim 1, wherein the first sensing device is attached to an inner surface of the container body.

4. A container according to claim 1, wherein the container comprises a part-conical body portion.

5. A container according to claim 4, wherein the first sensing device is provided in the part-conical body portion of the container.

6. A container according to claim 1, comprising an outlet and an outlet valve for selectively opening and closing the outlet, wherein the first sensing device is arranged to sense downstream of the outlet valve.

7. A container according to claim 1, wherein the container comprises a plurality of sensing devices.

8. A container according to claim 1, wherein the first sensing device comprises a temperature sensor and/or a humidity sensor and/or a sensor for determining the dew point within the container.

9. A container according to claim 1, wherein a further second sensing device is provided in an additive manufacturing machine.

10. A container according to claim 1, wherein the first sensing device and the second sensing device each comprise temperature sensors, and wherein a first temperature reading from the temperature sensor of the first sensing device is compared to a second temperature reading from the temperature sensor of the second temperature device, and a determination is made based on those temperature readings about whether the container is safe to be opened.

11. A container according to claim 7, wherein the difference between the temperature received from the temperature sensor of the first sensing device and the temperature received from the temperature sensor of the second sensing device is used to make the determination about whether the container is safe to open.

12. A container according to claim 1, wherein the step of determining if the container is safe to open is recorded.

13. A container according to claim 1, wherein the container is configured to be locked if it is determined that the container is not safe to open.

14. A container according to claim 1, wherein the container comprises an antenna for use in determining a location of the container within the confined environment.

15. A container according to claim 14, wherein the location of the container within the confined environment is determined by triangulation of the container's antenna.

16. A container according to claim 1, wherein the container comprises a Radio-frequency identification tag for determining the location of the container within the confined environment.

17. A container adapted to store a quantity of metal powder, the container comprising:
a container body having an opening, and
a first sensing device for sensing the temperature of the powder rind/or the humidity level inside the container, wherein a first reading received from the first sensing device is compared to a second reading received from a second sensing device configured to sense the temperature and/or humidity level of an environment outside of the container, and wherein the container is configured to communicate with the nearest available second sensing device attached to a surface of a confined environment,
and based on the first reading and the second reading, a user is provided within an indication about whether the container can be opened and of how much time is needed for the powder in the container to acclimatise to its surroundings.

18. A system comprising an additive manufacturing machine and a container adapted to store a quantity of metal powder, the container comprising:
a container body having a sealed opening, and
a first sensing device for sensing the temperature of the powder and/or the humidity level inside the container, wherein a first reading received from the first sensing device is compared to a second reading received from a second sensing device configured to sense the temperature and/or humidity lei el of an environment outside of the container, and wherein the container is configured to communicate with the nearest available second sensing device attached to a surface of a confined environment in which the container is being stored, and based on the first reading and the second reading, a user is provided within an indication of whether the metal powder in the sealed container has acclimatised to its surroundings and whether the container is safe to open.

19. A container according to claim 18, wherein the additive manufacturing machine comprises an inlet valve for selectively opening and closing an additive manufacturing machine inlet and the first sensing device is provided in a region between an outlet valve of the container and the inlet valve of the additive manufacturing machine, or in the additive manufacturing machine.

* * * * *